H. G. MARTIN.
ELECTRIC TELEGRAPHIC APPARATUS.
APPLICATION FILED JULY 1, 1911.
1,042,457.
Patented Oct. 29, 1912.
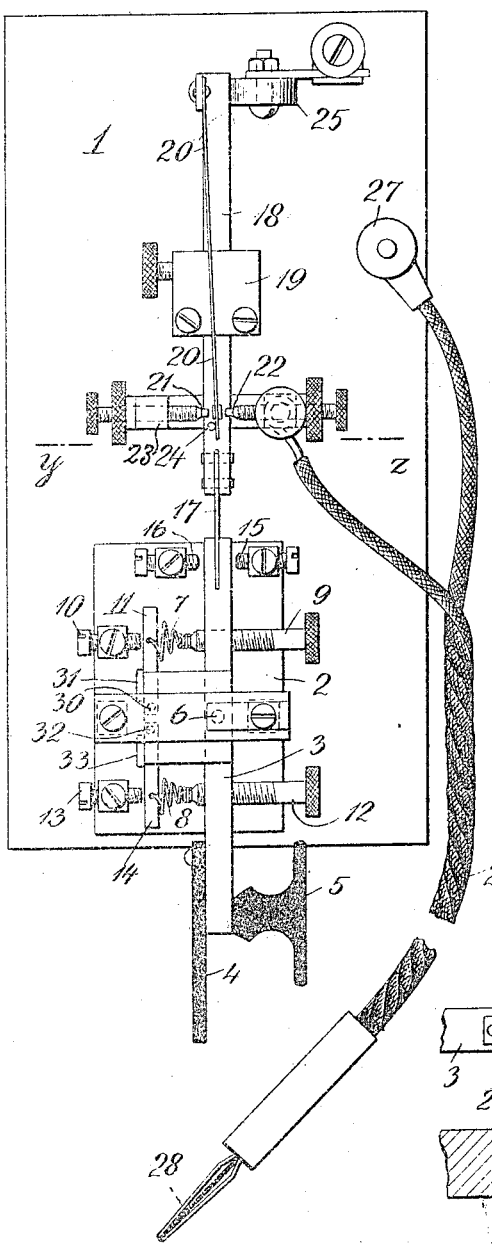
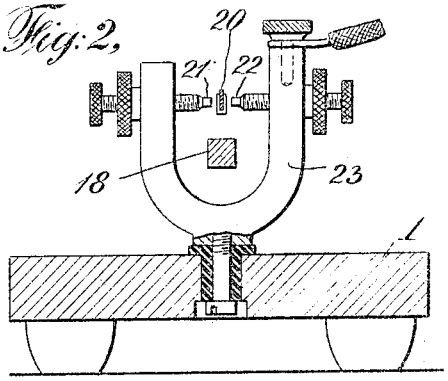
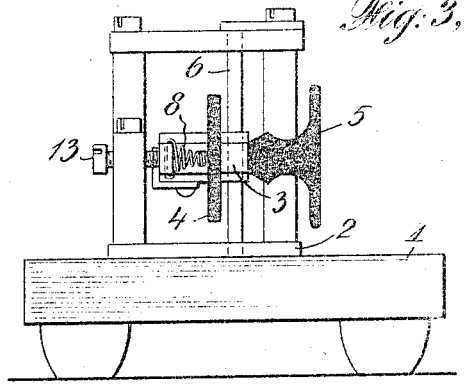
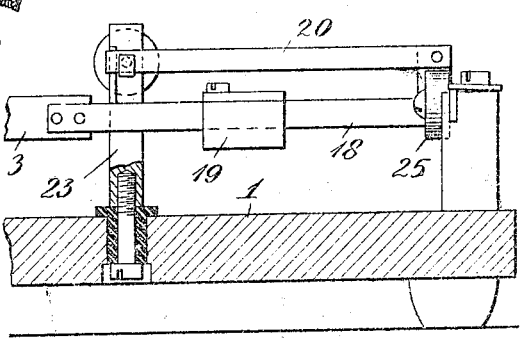
Witnesses:
Max B. A. Doring
Philip Sinnott
Horace G. Martin, Inventor
By his Attorney
Murray Corrington

UNITED STATES PATENT OFFICE.

HORACE G. MARTIN, OF EAST RUTHERFORD, NEW JERSEY.

ELECTRIC TELEGRAPHIC APPARATUS.

1,042,457.      Specification of Letters Patent.      Patented Oct. 29, 1912.

Application filed July 1, 1911. Serial No. 636,536.

*To all whom it may concern:*

Be it known that I, HORACE G. MARTIN, a citizen of the United States, residing at East Rutherford, in the county of Bergen and State of New Jersey, have invented certain new and useful Improvements in Electric Telegraphic Apparatus, of which the following is a specification, reference being had to the drawings accompanying and forming part of the same.

My invention relates to improvements in electric telegraphic apparatus and its main purpose is to provide means whereby the operator may send messages with less manual labor than is required with the apparatus commonly used.

Referring to the accompanying drawing, Figure 1, is a plan or top view of one embodiment of a complete apparatus; Fig. 2 is a view of a portion of the apparatus of Fig. 1 on the line Y—Z, looking upward; Fig. 3 is an end view of Fig. 1 looking upward; and Fig. 4 is a side view looking to the left of that portion of Fig. 1 above (right hand side of) the line Y—Z, omitting the two wire connections.

Considering the apparatus shown in the drawings in greater detail, Fig. 1 consists of a suitable base 1 (preferably of metal) on which rests a suitable framework 2 for mounting various working parts. A manually operated key or lever 3, having insulated parts 4 and 5 for preventing shock to the operator is to be moved preferably to the right and left, and for this purpose it is supported on a rotating vertical rod or shaft 6 pivoted in said framework, as shown in Fig. 3. Two springs 7 and 8 for returning key 3 to normal are arranged on opposite sides of shaft 6. Spring 7 may if desired be adjusted by screw 9 and have a pivoted bearing 11, and spring 8 may be adjusted by a similar screw 12 and have a pivoted bearing 14. Adjustable stops 16 and 15 may be used, if desired, for limiting the right and left hand movements of key 3. A flat spring 17 is securely fastened by one end to the key or lever 3 and by its other end to a bar or shaft 18, which may carry a movable weight 19, adjustable as to position. There is also mounted on rod or shaft 18 a spring 20 which is adapted to move at different times against the two points 21 and 22, adjustably affixed to a suitable yoke or support 23 that is secured to, but insulated from, the base 1, as shown in Fig. 2. A pin 24 may be employed to hold the contact spring 20 normally under a slight tension if desired. A suitable stop 25 for deadening or quickly stopping the movements of the shaft 18 may also be employed. Bearing 11 for spring 7 is pivoted on a small shaft or rod 30 and is normally pressed by said spring against a stop 31 which is fastened to the under side of key 3, and the same construction is adapted for support 14 of spring 8, pivoting shaft 32 and stop 33. The parts 7, 9, 11, 30, 31 and 8, 12, 14, 32, 33 are connected to and move with key 3, and there is preferably a small space normally between parts 10 and 11, and between parts 13 and 14. Therefore, when the operator's end (4—5) of key 3 is moved to the right, spring 7 is compressed but the tension of spring 8 is not affected, and when the key is moved to the left, spring 8 is compressed but spring 7 is not affected.

Suitable wire connections 26 may be employed for connecting my apparatus with an outside electrical circuit, consisting of the usual twisted insulated wires, one of which is connected through an ordinary binding post 27 with the metallic base 1 and the other of which is connected with the insulated contact yoke 23, Figs. 1 and 2. At the opposite end is an ordinary insulated plug 28 for connection with a line wire in the usual manner. All parts of the apparatus are in electric contact with the base 1 (and one of the wires) except insulated yoke 23 and points 21 and 22.

The operation of the apparatus will now be readily understood. When the operator desires to send a message (the plug 28 being properly connected), he places his hand upon the insulated parts 4 and 5 and moves that end of the lever 3 quickly to the right bringing the other end against stop 16 and slightly compressing spring 7. This moves shaft 18 and all parts connected therewith to the left away from the rest 25 and causes them to vibrate more or less rapidly according to the position of the weight 19, from left to right upon spring 17. With each vibration of shaft 18 spring 20 makes and breaks an electric circuit through point 21, the current flowing through one of the wires 26, post 27, metallic base 1, the supporting framework to shaft 6, lever 3, spring 17, shaft 18, and spring 20 into point 21 and insulated yoke 23, and thence by the other wire and contact plug 28 to the outside circuit. These successive makes and breaks of the circuit between spring 20 and point 21 represent the dots of an ordinary telegraphic message. The operator holds key 3 in the right hand position until the vibrations of the parts 18 and 20 produce the required number of makes and breaks (that is, dots,) between the points 20 and 21 and then allows the key to return to its normal position by the action of spring 7, and stop 25 causes the vibrations to quickly cease. It will be observed that any required number of dots for a telegraph message may thus be made by a single movement of lever 3. When the operator desires to make a contact representing a dash in a telegraphic message, he moves key 3 to the left, bringing its other end against the stop 15 and compressing spring 8. This causes shaft 18 and contact spring 20 to move in the other direction and make the same electrical circuit through spring 20 and point 22. The lever being held in the left hand position the required length of time, the operator releases the pressure thereon and permits spring 8 to return it to normal position. By thus moving the lever to the right and left in the manner described, the operator may send any telegraphic message with less labor than required with the standard telegraphic instrument. Stop 15 may be omitted and also spring 8, as the movement of key 3 to the left puts spring 17 under sufficient tension to return the key to normal position.

I claim:

1. In an electric telegraphic apparatus, the combination of an operator's key, a free vibrator whose movements are controlled by said key, a spring directly connecting said key and vibrator and on which the latter oscillates, and a circuit controller operating with said vibrator for making both the dots and the dashes of a telegraphic message.

2. In an electric telegraphic apparatus, the combination of an operator's key, a free vibrator controlled by said key, a spring directly connecting said key and vibrator and on which the latter oscillates, and means controlled by the movements of said vibrator for making and breaking an electric circuit and for producing both the dots and the dashes of a telegraphic message.

3. In an electric telegraphic apparatus, the combination of an operator's key, a free vibrator whose movements are controlled by said key, a spring forming a direct connection between said key and vibrator and on which the latter oscillates, and a circuit controller operated by said vibrator for making the dots of a telegraphic message when said key is moved in one direction and for making the dashes of said message when said key is moved in the other direction.

4. In an electric telegraphic apparatus, the combination of an operator's key movable in two directions, a free vibrator, whose movements are controlled by said key, a spring forming a direct connection between said key and vibrator and on which the latter oscillates, and two springs carried by said key for returning the same to its normal position and so arranged that the tension of one spring is increased while the tension of the other is unaffected, and vice versa, according as said key is moved in one direction or the other.

5. In a telegraphic transmitter, in combination, a free vibrator adapted to make and break an electrical circuit for producing both the dots and dashes of a telegraphic message, a key-lever for controlling the operation of said vibrator and a spring forming a direct connection between said key-lever and vibrator and on which said vibrator oscillates.

HORACE G. MARTIN.

Witnesses:
MALCOLM N. BUTLER,
MURRAY CORRINGTON.